United States Patent
Nakazawa et al.

(10) Patent No.: US 8,140,337 B2
(45) Date of Patent: Mar. 20, 2012

(54) APPARATUS, METHOD AND PROGRAM FOR TEXT MINING

(75) Inventors: Satoshi Nakazawa, Tokyo (JP); Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 499 days.

(21) Appl. No.: 12/375,638

(22) PCT Filed: Jul. 18, 2007

(86) PCT No.: PCT/JP2007/064145
§ 371 (c)(1),
(2), (4) Date: Jan. 29, 2009

(87) PCT Pub. No.: WO2008/015907
PCT Pub. Date: Feb. 7, 2008

(65) Prior Publication Data
US 2009/0306982 A1   Dec. 10, 2009

(30) Foreign Application Priority Data
Aug. 3, 2006   (JP) .................................. 2006-212083

(51) Int. Cl.
*G10L 15/18* (2006.01)
*G10L 15/00* (2006.01)
*G10L 21/00* (2006.01)
*G06F 17/27* (2006.01)
*G06F 17/30* (2006.01)

(52) U.S. Cl. ............ 704/257; 704/9; 704/231; 704/251; 704/270; 707/741; 707/750

(58) Field of Classification Search ........................ None
See application file for complete search history.

(56) References Cited

U.S. PATENT DOCUMENTS
6,185,527 B1 *   2/2001   Petkovic et al. .............. 704/231
(Continued)

FOREIGN PATENT DOCUMENTS
JP   1995319880 A   12/1995
(Continued)

OTHER PUBLICATIONS
International Search Report for PCT/JP2007/064145 mailed Aug. 21, 2007.
(Continued)

*Primary Examiner* — Matthew Sked

(57) ABSTRACT

Disclosed is an apparatus includes a text input device that inputs text data provided with confidence measure, as subject for mining, a language processing unit that performs language analysis of the input text data provided with the confidence measures, a confidence measure exploiting characteristic word count unit that counts the characteristic words in the input text to provide a count result and that exploits the statistical information and the confidence measures provided in the input text to correct the count result obtained, a characteristic measure calculation unit that calculates the characteristic measure of each characteristic word from the corrected count result, a mining result output device that outputs the characteristic measure of each characteristic word obtained, a user operation input device for a user to input setting for language processing of the input text and setting for a technique for calculating the characteristic measure being found, a mining process management unit that transmits a user's command delivered from the user operation input device to respective components, and a statistical information database that records and holds the statistical information representing the property of the input text that may be presupposed.

11 Claims, 5 Drawing Sheets

U.S. PATENT DOCUMENTS

| | | | |
|---|---|---|---|
| 7,027,987 B1 * | 4/2006 | Franz et al. | 704/236 |
| 7,693,872 B2 * | 4/2010 | Gorodyansky et al. | 707/999.107 |
| 2002/0016800 A1 * | 2/2002 | Spivak et al. | 707/523 |

FOREIGN PATENT DOCUMENTS

| | | | |
|---|---|---|---|
| JP | 1999073149 | A | 3/1999 |
| JP | 2000067085 | A | 3/2000 |
| JP | 2001134617 | A | 5/2001 |
| JP | 2004164079 | A | 6/2004 |
| JP | 2005165754 | A | 6/2005 |
| JP | 2005173950 | A | 6/2005 |

OTHER PUBLICATIONS

International Preliminary Report on Patability for PCT/JP2007/064145 completed Jul. 14, 2008.

Kenji Yamanishi et al., "Mining Open Answers in Questionnaire Data", IEEE Intelligent Systems, Sep./Oct. 2002, pp. 58-63.

Kenji Yamanishi, "A Decision-Theoretic Extension of Stochastic Complexity and its Applications to Learning", IEEE Transactions on Information Theory, vol. 44, No. 4, Jul. 1998, pp. 1424-1439.

Frank Wessel et al., "Confidence Measures for Large Vocabulary Continuous Speech Recognition", IEEE Transactions on Speech and Audio Processing, vol. 9. No. 3, Mar. 2001, pp. 288-298.

Japanese Action for JP 2006-212083 issued Jul. 17, 2009.

* cited by examiner

FIG. 2

TEXT 1: 新 [0.92] / 機種 [0.81] / の [0.69] / NP901 [0.88] / 厚く [0.76] / て [0.54] / 嫌 [0.84] / ...
SHIN KISHU NO ATSUKU TE IYA
(NEW) (MODEL) (OF) (THICK) (AND) (I DON'T LIKE IT)

TEXT 2: ちょっと [0.72] / 携帯 [0.81] / 追えた [0.45] / の [0.46] / だけど [0.98] / ...
CHOTTO KEITAI OETA NO DAKEDO
(A LITTLE) (A MOBILE PHONE) (FOLLOW UP) (IS) (THOUGH)
            燃えた [0.40]
            MOETA
            (BURNED)
            得た [0.15]
            ETA
            (OBTAINED)

APPARATUS, METHOD AND PROGRAM FOR TEXT MINING

This application is the National Phase PCT/JP2007/064145, filed Jul. 18, 2007, which claims the benefit of Japanese Patent Application No. 2006-212083, filed on Aug. 3, 2006, which is hereby incorporated by reference herein in its entirety.

TECHNICAL FIELD

This invention relates to an apparatus and a method for text mining and a corresponding program for processing. More particularly, it relates to an apparatus, a method and a program for text mining that allow for calculations to high accuracy of characteristic measures of the characteristic information in an error containing input text, in particular a speech recognition text, using confidence measures attached to the result of recognition.

BACKGROUND ART

<Definition of Terms>

The terms used in the present specification and claims will be explained.

'characteristic word': A collective term for a set of one or more word units, such as single words or phrases, extracted by text mining technique.

'characteristic measure': The measure indicating to which extent each characteristic word is characteristic of a category in question. It is also termed 'score' in the field of text mining.

'correcting': Estimating a correct value from error containing result using confidence measure and statistical information is termed 'correcting'.

<Text Mining Technique>

There is a text mining technique which excerpts such words or phrases that may be found frequently in a large quantity of texts, such as questionnaires or business reports, or that are meaningful from statistical criterion, to analyze useful information, such as text tendencies.

Non-Patent Document 1 shows an example of this sort of the text mining technique. With the text mining technique of Non-Patent Document 1, a number of texts classified in two or more categories at the outset are entered as input.

If once an input text is provided, the number of times of occurrences of a characteristic word (see the definition of the term given above) appearing in the text in each category is counted and, from the count result, a characteristic measure (see the definition of the term given above) of each characteristic word is calculated from one category to another.

As regards the characteristic measure, there are techniques of:

directly using the number of times of occurrences of each characteristic word, as the characteristic measure, and modifying the number of times of occurrences of each characteristic word from one category to another using a statistical criteria such as the mutual information quantity.

Non-Patent Document 1 uses a statistical quantity 'ESC', disclosed in Non-Patent Document 2, as the characteristic measure.

The text mining technique searches which characteristic word has a high characteristic measure in a given category, and uses the result of the search for marketing or business analyses. For example, it is assumed that, as a result of sorting questionnaires for cars from one car producer to another and performing text mining of texts on impression entertained for each car producer, the characteristic measure of a characteristic word 'for ordinary people' has been the highest in a category of a company A. In this case, it is seen that an impression 'for ordinary people' is strong for many respondents to questionnaires as a brand image of the company A. If, on the other hand, the characteristic measure of a characteristic word 'for ordinary people' is low and the characteristic measure of a characteristic word 'high class' is high in a category of a company B, it is seen that the brand image of the company B is not a maker for ordinary people but rather a maker for 'high class' cars.

Patent Document 1 discloses, as an apparatus that captures the customers' subjective information by the text mining technique for use in conducting more accurate data analyses, such a configuration that finds the statistical information, exemplified by the frequency of occurrences of a certain noun phrase in a sub-document or its distribution in the entire questionnaires. Patent Document 2 discloses a document processing apparatus that may improve the accuracy in extracting important words in electronic documents that may contain an error(s). In this case, the frequency of occurrence of a word is adopted as the evaluation information, which evaluation information is used for representing the importance measure. An importance measure correction unit calculates a value for correcting the importance measure in connection with the similarity measure and the importance measure of control words. However, the inventions described in the Patent Documents 1 and 2 differ from the present invention, as now described in detail, in the processing manner, configuration, operation and the meritorious effects.

Non-Patent Document 1:

K: Yamanishi and H. Li, "Mining open answers in questionnaire data", IEEE Intelligent Systems, Sep./Oct., pp. 58-63, 2002

Non-Patent Document 2:

K: Yamanishi, "A Decision-Theoretic Extension of Stochastic Complexity and its Applications to Learning", IEEE Trans. Information Theory, vol. 44, No. 4, July 1988, pp. 1424-1439

Non-Patent Document 3:

Frank Wessel et al., "Confidence Measures for Large Vocabulary Continuous Speech Recognition", IEEE Trans. Speech and Audio Processing, vol. 9, No. 3, March 2001, pp. 288-298

Patent Document 1;

JP Patent Kokai Publication No. JP2004-164079A

Patent Document 2:

JP Patent Kokai Publication No. JP2005-173950A

SUMMARY

The entire contents of the disclosures of the Non-Patent Documents 1 to 3 and the Patent Documents 1 and 2 are incorporated herein by reference.

The conventional text mining technique counts the number of times of occurrence of characteristic words in an input text and calculates the characteristic measures using the count results.

However, if the input text contains an error(s), as in the case of a speech recognition text, the number of the characteristic words is not counted accurately due to those errors, with the result that marked errors are also produced in the calculations of the characteristic measures.

It is an object of the present invention to provide an apparatus, a method and a program for text mining according to which a characteristic word as well as a characteristic measure thereof may be output to higher accuracy.

To solve one or more of the above problems, the invention disclosed in the present invention may be summarized substantially as set forth below. The figure numbers as well as reference numerals or symbols within parentheses are merely for correspondence to the illustrations in the drawings to help understand the present invention and hence are not to be construed as limiting the invention.

Suppose that, at a certain word or phrase in input text data, confidence measure that represents an index of possible correctness of a passage of the word or the phrase is provided, or that the tendency to errors contained in the input text, is afforded as the statistical information. The present invention uses confidence measure or statistical information to estimate a correct value of the characteristic measure or the count result of the characteristic word to output the characteristic word and characteristic measure thereof to high accuracy as compared with the case of direct text mining of the input text.

A text mining apparatus in one aspect of the present invention includes a confidence measure exploiting characteristic word count unit (30 of FIG. 1) that, in counting a characteristic word in the result of the language analysis of the text provided with a confidence measure, corrects the count result of the characteristic word using the confidence measure provided in the text, a characteristic measure calculation unit (40 of FIG. 1) that calculates a characteristic measure of the characteristic word based on the count result, and a mining result output device (50 of FIG. 1) that outputs the calculated characteristic measure of each characteristic word as being the result of the text mining.

One or more of the above problems may be solved by the above described configuration in which the effect of an error(s) contained in the input text on the count of the characteristic word may be corrected using the confidence measure provided in the text (see the definitions of terms).

A text mining apparatus in another aspect of the present invention includes a confidence measure exploiting characteristic word count value distribution calculation unit (90 of FIG. 4) that, in counting the characteristic word in the result of the language analysis of the input text provided with a confidence measure, calculates the distribution of the count results of the characteristic words using the confidence measures provided in the text, a count value distribution exploiting characteristic measure calculation unit (100 of FIG. 4) that calculates the characteristic measure of the characteristic word based on the count value distribution obtained and a mining result output device (50 of FIG. 4) that outputs the characteristic measure of the characteristic word as the result of the text mining.

One or more of the above problems may be solved by the above described configuration in which the effect of the error(s) contained in the input text on the characteristic measure of each characteristic word may be corrected using the confidence measures provided in the text (see the definition of terms (3)).

The configuration of the apparatus (method or program) of the present invention may be substantially summarized as follows:

The apparatus (method or program) of the present invention includes a characteristic word count unit (step or processing) that corrects the count result using statistical information representing a property of the input text in carrying out the characteristic word-based count in the input text.

The apparatus (method or program) of the present invention also includes a confidence measure exploiting characteristic word count unit (step or processing) that corrects the count result using the confidence measure attached to the input text in carrying out the characteristic word-based count in the input text.

The apparatus (method or program) of the present invention also includes a confidence measure exploiting characteristic word count unit (step or processing) that corrects the count result using the confidence measure attached to the input text and statistical information representing a property of the input text in carrying out the characteristic word-based count in the input text.

The apparatus (method or program) of the present invention also includes a text input device (step or processing) that accepts, as input, an input text part or all of which includes plurality of candidate letter/character strings.

The apparatus (method or program) of the present invention also includes a characteristic word count value distribution calculation unit (step or processing) that calculates a probability distribution of the count values of the characteristic words contained in the input text and a count value distribution exploiting characteristic measure calculation unit (step or processing) that calculates the characteristic measure of each characteristic word, using the probability distribution of the count values calculated by the characteristic word count value distribution calculation unit, and uses the result as being the result of the text mining.

In the apparatus (method or program) of the previous paragraph, the characteristic word count value distribution calculation unit (step or processing) uses statistical information representing a property of the input text in calculating a probability distribution of the count values of the characteristic words contained in the input text.

In the apparatus (method or program) of the aforesaid paragraph, the characteristic word count value distribution calculation unit (step or processing) uses the confidence measures provided in the input text in calculating a probability distribution of the count values of the characteristic words contained in the input text.

In the apparatus (method or program) of the aforesaid paragraph, the characteristic word count value distribution calculation unit (step or processing) uses the confidence measures provided in the input text and statistical information representing a property of the input text in calculating a probability distribution of the count values of the characteristic words contained in the input text.

The apparatus (method or program) of the present invention further includes a text input device that accepts, as input, an input text part or all of which is composed of a plurality of candidate letter/character strings.

The apparatus (method or program) of the present invention further includes a text input device that accepts, as input text, an error containing text recognized by speech recognition means or letter recognition means.

According to the present invention, the characteristic measure may be found more accurately than in case the characteristic measure of the characteristic word is directly calculated, without exploiting the confidence measure, even though an error(s) is contained in the input text data.

Thus, if a substitution error, caused by replacing a characteristic word by another word, or an insertion error, caused by insertion of an out-of-place word, is contained in the input text, the effect of such error may be suppressed provided that the confidence measure attached to the error location is of a proper value. The user may, in this manner, obtain the result of mining of higher accuracy.

The reason these beneficial effect is brought about may be as indicated below.

According to the present invention, the count value or the characteristic measure of the characteristic word is corrected, when counting the characteristic word or calculating the characteristic measure of the characteristic word, in such a manner as to reduce the adverse effect of the above error, using the confidence measure attached to the input text or the separately provided statistical information.

Further, according to the present invention, even if there is an ambiguous passage(s) in the input text, and the ambiguous passage(s) includes a plurality of candidates, it is possible to accept the input text containing the ambiguous passage(s) to find the characteristic measure to high accuracy, as in the case of accepting a non-ambiguous text, provided that the confidence measure is attached to each candidate of the ambiguous passage(s).

The reason this beneficial result may be accrued is that, when counting the characteristic word or calculating the characteristic measure of the characteristic word, the count value or the characteristic measure obtained is corrected using the confidence measure of the each candidate for the ambiguous passage(s). By so doing, it is possible to eliminate the risk that the candidates of the ambiguous passage(s) are counted in multiplicity thus possibly producing an error in the calculation of the characteristic measure.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 shows an instance of an input text provided with confidence measure in the first exemplary embodiment of the present invention.

PREFERRED MODES FOR CARRYING OUT THE INVENTION

Figure 1:
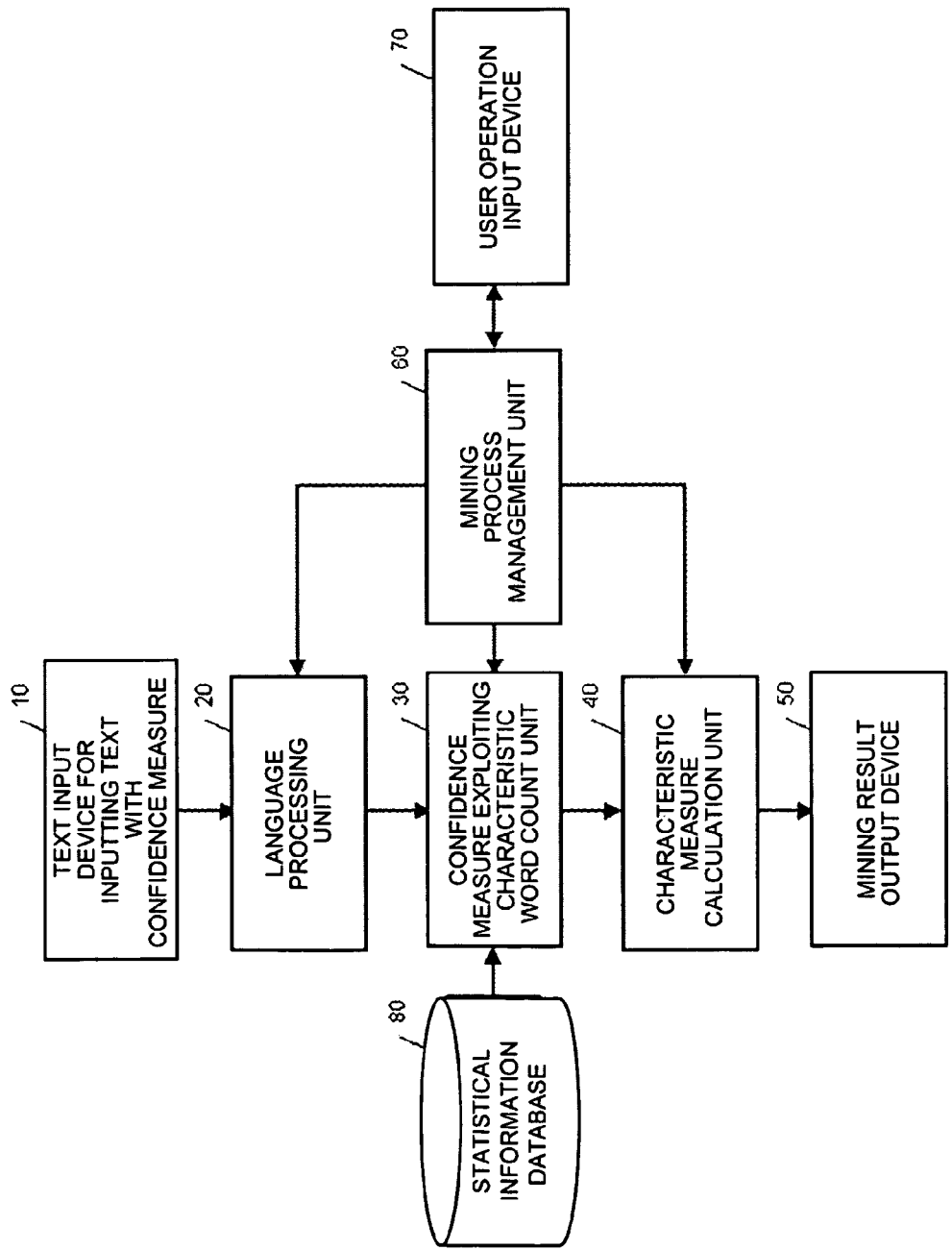
FIG. 1 is a block diagram showing the configuration of a first exemplary embodiment of the present invention.

Certain preferred modes of the present invention are now described in detail with reference to the drawings.
<First Exemplary Embodiment>
Referring to FIG. 1, a first exemplary embodiment of the present invention includes a text input device (10 of FIG. 1) for inputting text data subjected to mining, provided with the confidence measures, and a language processing unit (20 of FIG. 1) for performing language analysis of the input text data. The first exemplary embodiment also includes a confidence measure exploiting characteristic word count unit (30 of FIG. 1) that counts the characteristic word in the input text and that corrects the obtained count result by exploiting the statistical information and the confidence measures provided in the input text. The first exemplary embodiment also includes a characteristic measure calculation unit (40 of FIG. 1) that calculates characteristic measure from the count result, and a mining result output device (50 of FIG. 1) that outputs a characteristic measure of each characteristic word obtained. The first exemplary embodiment also includes a user operation input device (70 of FIG. 1) for a user to input setting for language processing of the input text and setting of a technique of calculating the characteristic measure being found. The first exemplary embodiment also includes a mining process management unit (60 of FIG. 1) for transmitting a user's command entered from the user operation input device to respective component parts concerned. The first exemplary embodiment further includes a statistical information database (80 of FIG. 1) for recording and holding the statistical information showing the properties of the input text presumed to be entered. These respective components will now be described in order.
<Text Input Device 10 for Inputting a Text Provided with Confidence Measure>

The text input device 10 is a device for inputting text data which is to be a processing subject in carrying out the present invention. The text data may be read as a file from a recording device, such as a hard disc, or may be entered from another apparatus using communication means such as the Internet. Which configuration input apparatus is practically used is dependent on the objective and the status of using the exemplary embodiment of the present invention.

It is assumed that the input text is provided with a confidence measure attached to each letter/character string in the text for indicating the measure of correctness of the each letter/character string.

How to find the confidence measure differs with the sorts of the input texts or with the application and the objective for using the exemplary embodiment of the present invention.

There have so far been disclosed a large variety of techniques for calculating a confidence measure. The technique of Non-Patent Document 3 is among the techniques for finding the confidence measures for a speech recognition text. The term 'confidence measure' also appears in Non-Patent Document 3. The particular method for calculating the confidence measure is outside the scope of the present invention and hence is not described in further detail.

It is not mandatory that the confidence measures are attached to all parts or passages of the input text. Those parts or passages the confidence measures are not attached to may be treated as being provided with a preset default confidence measure.

It is noted that part or all of the input text may be composed of a plurality of ambiguous candidate letter/character strings, as in a word graph or N-best. It is presupposed that, in such case, the confidence measures are attached to the respective candidate letter/character strings.
<Example of Calculation of a Confidence Measure (a Case where Confidence Measures are not Attached to all of Candidate Letter/Character Strings>

If not all of candidate letter/character strings of an input text are provided with the confidence measures, the confidence measure is provided by the following calculation method.

If the confidence measure has not been normalized, the default confidence measure is directly provided to each candidate letter/character string not provided with the confidence measure.

If the confidence measure has been normalized, the sum of the confidence measures of the candidates provided with the confidence measures attached thereto is subtracted from the default confidence measure. The result of subtraction is then divided by the number of the candidates not provided with the confidence measures. The result of division is provided, as being a confidence measure, to each of the candidate not provided with the confidence measure.

For example, suppose that there are four ambiguous candidate letter/character strings in a certain part or passage of the input text, one of the candidates is provided with the confidence measure of 0.4 and the remaining three candidates are not provided with the confidence measures. Also suppose that the confidence measure is normalized to a probabilistic value not less than 0 and not more than 1 and that the default value of the confidence measure is 1. The confidence measure then is $$(1-0.4)/3=0.2$$

The confidence measure of 0.2 is attached to each of the three candidates not provided with the confidence measures.
<Example of Text not Provided with the Confidence Measures>

FIG. 2 depicts an example of a text provided with confidence measures. A slash "/" in the text denotes a word division and a numerical value enclosed within a square bracket denotes the confidence measure of a directly previous word.

It is assumed that, in the example of FIG. 2, the confidence measure is normalized to a random variable that assumes a value ranging from 0 to 1 both inclusive. The confidence measure of 0 indicates that a probability of the word in question to be correct is zero and, conversely, the confidence measure of 1 indicates that the word represents a correct solution.

The text 1 of FIG. 2 is composed all of unambiguous character strings. On the other hand, the test 2 is ambiguous in the part or passage [oeta (followed-up)] which part or passage is composed of three candidates [oeta (followed-up)] [moeta (burned)] and [eta (obtained)].

The numerical values enclosed within square brackets, next following [oeta] [moeta] and [eta], denote the confidence measures of the respective candidates.

For example, the confidence measure of [eta] is [0.10] which is lowest among the confidence measures of the three candidates.

In the example of FIG. 2, the confidence measure is accorded from word to word. This is not mandatory such that it is only sufficient if the confidence measure is accorded from one optional letter/character string to another or from one sentence to another.

In the example of FIG. 2, the confidence measure, provided in the input text, is normalized to a value not less than 0 and not greater than 1 to denote the correct solution probability of the part or passage of interest. If the confidence measure is not normalized, the text input device 10 that receives the text provided with the confidence measures normalizes the confidence measure to change the confidence measure into a correct solution probability ranging from 0 to 1 both inclusive.

The specific normalization process differs depending on which confidence measure is to be used in carrying out the exemplary embodiment of the present invention. It is sufficient if the calculations for normalization are carried out depending on the properties of the confidence measure used or on the method for calculations used.

It is also possible to provide a separate corpus for evaluating the input text to find an expression for the relationship between the confidence measure and the actual percentage of the correct solution. The so obtained expression may then be used for this normalization.

<Language Processor 20>

The language processing unit 20 carries out language processing, such as morphological analysis, dependency parsing, synonym analysis or unnecessary word processing, on a text supplied to the text input device 10, provided with confidence measures, in order to perform transformation and shaping to units of characteristic words to be dealt in the text mining apparatus of the present invention.

To which units of the characteristic words the parts or passages of the input text in question are to be transformed or shaped differs in dependence upon the applications or objectives of using the exemplary embodiment of the present invention or upon user's operations as entered by the user operation input device 70.

These units may be
  a word unit resulting from division by morphological analysis;
  a paragraph unit composed of a plurality of neighboring words collected together; or
  a word set unit composed of a plurality of words semantically correlated with one another.

This operation of the language processing unit 20 is similar to that of the language processing in the ordinary text mining technique, and hence is not described herein in further detail. It is noted however that, if the unit of assignment of the confidence measure attached in the input text differs from the unit of the characteristic word obtained on transformation or shaping by the language processing unit 20, it is necessary to change the assignment so that there is one confidence measure for each characteristic word unit.

As regards the technique of changing the assignment of the confidence measure, if the unit of the characteristic word becomes shorter in length than the unit assigned to the input text, the original confidence measure may be used as it is.

For example, if a part or passage 'language processing [0.75]' is to be divided into two characteristic words 'language' and 'processing', the original confidence measure [0.75] is used for the two characteristic words.

If the unit of the characteristic word becomes longer in length than the unit assigned in the input text, or the divisions of the assignment differ from those used in the input text, several assignment methods, given below, may be used.

(a1) An average value of all confidence measures of original assignment units, overlapped with the unit of the characteristic word, is used.

(a2) A largest one of the confidence measures of the original assignment units, overlapped with the unit of the characteristic word, is used.

(a3) A smallest one of the confidence measures of the original assignment units, overlapped with the unit of the characteristic word, is used. Or, (a4) one of the original assignment units, constituting a principal element of the characteristic word, is selected out of the original assignment units overlapping with the unit of the characteristic word. The confidence measure of the so selected assignment unit is adopted as the confidence measure of the characteristic word in its entirety. The principal element may be enumerated by
  a first occurring noun; and
  a longest letter/character string.

There may also be other techniques of newly assigning the confidence measures. This has to do with the problem of statistics of deciding on a sole representative value out of a plurality of values, and which technique should be used in practice is to be pre-set depending on the application or objective of using the exemplary embodiment of the present invention.

For example, it is supposed that, in deciding on an assignment method, it is desired to handle [new] and [model] by a sole characteristic word [new model] in the text 1 of FIG. 2. In such case, the assignment method may be set so that the confidence measure of 0.81 of the longer semantically meaningful character string [model] is to be used as the confidence measure of [new model].

<Confidence Measure Exploiting Characteristic Word Count Unit 30>

The confidence measure exploiting characteristic word count unit 30 is a component that counts how many times each characteristic word occurs in the text of a certain specified subset of the input text and that delivers the count result to the characteristic measure calculation unit 40.

It is noted that the 'certain specified subset of an input text' differs in dependence upon the particular text mining technique used in the exemplary embodiment of the present invention and
the particular user's setting entered via the user operation input device 70 and the mining process management unit 60.

For example, there may be such a case where the characteristic of a company A is desired to be searched, with questionnaire data on cars as input. In this case, the number of times of occurrence of each characteristic word in only text of the category of the company A is counted; and
the number of times of occurrence of each characteristic word in only the text different from the text of the category of the company A is counted; and
the characteristic measure is found from the two count results for each characteristic word.

In the present example, a count operation is carried out for two subsets of the input text, namely 'text belonging to the category of the company A' and
'text not belonging to the category of the company A'.

Which count operation is to be performed on which subset of the input text is a problem concerned with the text mining technique at large, and hence is not described in further detail in the present specification.

However, the confidence measure exploiting characteristic word count unit 30 finds an estimated value of the number of times of occurrence of each characteristic word in the input text, using the confidence measure attached to the input text or
the statistical information on the tendency to errors of the input text as recorded in the statistical information database 80, and delivers the so estimated value to the characteristic measure calculation unit 40 in place of an actual count result. This is in contrast to the conventional text mining technique in which simply the number of times of occurrence of each characteristic word is counted and the so obtained actual count result is delivered.

The reason the estimated value is used as the count result is that, since an error(s) is contained in the input text, the count result obtained on simply counting the characteristic word is necessarily deviated from the correct count result.

The meanings of symbols used are now defined as in the following expressions (1) to (6):

$C(w)$: count result of a characteristic word w in the original error-free input text (1)

$CR(w)$: count result of a characteristic word w in the original input error containing text (2)

$CRc(w)$: number of correct solutions in $CR(w)$ (3)

$CRe(w)$: number of errors in actuality in $CR(w)$ (4)

$CD(w)$: number of a characteristic word w in the correct solution text that drop out or are replaced by errors (5)

$CG(w)$: an estimated value of $C(w)$ (6)

More exactly, the 'input text' in the explanation of the expressions (1) and (2) denotes a text of a specified subset of the input text which is the target of counting.

It is $CR(w)$ that can actually be measured on searching the error containing input text.

$CRe(w)$ denotes the sum of characteristic words w changed to w through error from expression inherently different from a characteristic word w and a characteristic word w that has come into existence through error from nothing.

$CD(w)$ denotes the number of characteristic words w inherently contained in the input text and that drop out by error or are replaced by other words to become unobservable in the error containing input text.

From the above definitions of the respective symbols, the following equations are necessarily derived:

$$CR(w) = CRc(w) + CRe(w) \qquad (7)$$

$$C(w) = CR(w) - CRe(w) + CD(w) \qquad (8)$$
$$= CRc(w) + CD(w)$$

If these symbols are used, the confidence measure exploiting characteristic word count unit 30 may be said to be a component for calculating an estimated value $CG(w)$ of the count result of the correct solution $C(w)$ from $CR(w)$ that may be observed from the error containing input text.

In the present specification, the estimated values of the equations (1) to (5) are each expressed by an upper-case letter G annexed to the trailing end of each symbol. For example, an estimated values of $C(w)$ and $CR(w)$ are expressed as $CG(w)$ and $CRG(w)$, respectively.

Several techniques may be used for calculating the estimated value $CG(w)$, as hereinafter explained.

<First Technique of Calculating an Estimated Value $CG(w)$>

The first technique performs truncation based on the confidence measure.

It is assumed that a characteristic word A is counted in an input text belonging to a certain category.

It is also assumed that the characteristic word A occurs thrice in the target text and the confidence measures of the three occurrences are 1, 0.8 and 0.4.

It is further assumed that a threshold value for truncation of 0.5 has been set via the user operation input device 70 and the mining process management unit 60. The threshold value for truncation of 0.5 implies that the confidence measure less than 0.5 is discounted.

At this time, $$CR(A)=3 \qquad (9)$$

provided that, since truncation based on the threshold value less than 0.5 for the confidence measure is set, the occurrence with the confidence measure equal to 0.4 is discarded.

Hence, an estimated value $CRcG(A)$ of $CRc(A)$ is as indicated by the following equation (10):

$$CRcG(A)=2 \qquad (10)$$

This value is output as the estimated value $CG(A)$ of the count result.

More exactly, we get, from the equation (8):

$$CG(w)=CRcG(w)+CDG(w) \quad (11)$$

Since the above equation (11) holds, the technique of using CRcG(A) as CG(A) may be said to be a simplifying technique which is based on the assumption that CDG(A) is very small and negligible.

If the statistical information that may be used for estimating this CDG(A) is stored in the statistical information database 80, such information is used to find CDG(A) which is substituted into the equation (11).

For example, if the probability that the characteristic word A that has occurred once in the correct solution text has dropped out or is changed to another word
- is directly saved in the statistical information database 80 or
- may be derived from other statistical information saved,
- the value thus stored or which may be derived is used. Further, if the statistical information is not the statistical information concerning the characteristic word A but is the more general statistical information that may be used for the characteristic word A, the value of the statistical information is used.

It is now supposed that
- the average probability $p1$ of a given characteristic word in the correct solution text to drop out by error and to vanish and
- the average probability $p2$ of the above characteristic word to be replaced by another word are saved in the statistical information database 80.

Then, $$CDG(w)=CG(w)*(p1+p2) \quad (12)$$

From the equations (11) and (12), the following equation (13)

$$CG(w)=CRcG(w)/(1-p1-p2) \quad (13)$$

is derived.

Thus, by substituting the estimated CRcG(A) for CRcG(w), we get an estimated count value CG(A) of the characteristic word A which takes account of the rate of dropout and replacement of the characteristic word A in the correct solution text.

Assuming that $p1=0.15$ and $p2=0.1$, an estimated count value CG(A) of the characteristic word CG(A), which has taken account of the rate of dropout and replacement, is $$CG(A)=2/(1-0.15-0.1)=\text{ca. } 2.7.$$

If the characteristic measure calculation unit 40 is able to accept a real number as the count result, the estimated count value is directly delivered as output.

If only an integer is accepted as the count result, the count result is output, as the part of the count result below the decimal point is rounded down, rounded up, or rounded.

With this first technique of truncation based on the confidence measure, it is possible to prevent the situation that a characteristic word which is caused to exist through error and which inherently is not in existence is counted and included in the count result of each characteristic word.

<Second Technique for Calculating the Estimated Value CG(w)>

As a second technique for calculating the estimated value CG(w), there is such a technique that regards the confidence measure attached to the site of occurrence of each characteristic word as the correct solution probability of the site in question and that delivers an expectation of the number of times of occurrence as the count result.

To this end, it is necessary that the confidence measures provided in the input text are normalized to random variables representing the correct solution probability not less than 0 and not greater than 1, as described above in the description of the text input device 10 that receives the text provided with the confidence measures.

Suppose now that, as in the first technique of truncation based on confidence measures, the number of times of occurrence of a certain characteristic word A in an input text belonging to a certain category, for example, is counted.

Also suppose that, as a result of ordinary counting, a certain characteristic word A appeared thrice in a text of interest, with the confidence measures of the respective occurrences being 1, 0.8 and 0.4. An expectation of the number of times of occurrence, expressed by a sum of (confidence measure× number of times of occurrence of the confidence measure) for the respective occurrences, is given by the following equation (14):

$$CRcG(A)=(1*1)+(0.8*1)+(0.4*1)=2.2 \quad (14)$$

This value is an estimated value CG(A) of the count result of the characteristic word A.

In case the statistical information usable for estimating CDG(A) is saved in the statistical information database 80, such information is used to find CDG(A), which CDG(A) may then be substituted into the equation (11) to enable more accurate calculations for finding the estimated value CG(A).

It is now assumed that, as in the above example shown in connection with the explanation of the technique of truncation based on the confidence measures,
- the average probability $p1$ of a given characteristic word in the correct solution text to drop out and vanish through error ($p1=0.15$) and
- the average probability $p2$ of the characteristic word to be replaced by another word ($p2=0.1$)

are saved in the statistical information database 80.

Then, from the equation (13), we get $$CG(A)=2.2/(1-0.15-0.1)=\text{ca. } 2.9 \quad (15)$$

The value 2.9 of the equation (15) becomes an estimated value of the count result. The floating point may be output as a real number or output by rounding as in the case of the above-described first technique.

Like the above-described first technique, the second technique of using an expectation of the number of times of occurrence has a beneficial effect that it is possible to prevent counting inherently non-existing characteristic words through error in a count result of the characteristic words.

The first technique by truncation based on the confidence measure of the characteristic word discards the characteristic word with the confidence measure less than or not greater than the threshold value, and thus differs from the second technique which uses an expectation. It may be said that the expectation represents the count result weighted by the confidence measure.

<Third Technique for Calculating the Estimated Value CG(w)>

The third method for calculating the estimated value CG(w) consists in regarding the confidence measure attached to the site of occurrence of each characteristic word as the correct solution probability of the site in question and to use the most frequent value of the number of times of occurrence as the count result.

To this end, the confidence measure attached to the input text need to be normalized to a stochastic variable indicating the correct solution probability of not less than 0 and not greater than 1, as already described in the explanation of the text input device 10.

It is supposed that a certain characteristic word A in an input text belonging to a certain category, for example, is counted, as in the above-described example of the truncation technique by confidence measure. It is also supposed that, as a result of the ordinary counting, the characteristic word A appears thrice in the text of interest, and that the confidence measures of the three occurrences are 1, 0.8 and 0.4.

The possible count results and the probabilistic values for them are calculated. The count result with the highest probabilistic value represents the most frequent value for this case. By carrying out the calculations, we get the following probabilistic values:

probability for zero occurrence=$(1-1)*(1-0.8)*(1-0.4)=0$
probability for one occurrence=$1*(1-0.8)*(1-0.4)+(1-1)*0.8*(1-0.4)+(1-1)*(1-0.8)*0.4=0.12$
probability for two occurrences=$1*0.8*(1-0.4)+1*(1-0.8)*0.4+(1-1)*0.8*0.4=0.48+0.08=0.56$
probability for three occurrences=$1*0.8*0.4=0.32$ Since the probability for two occurrences is the maximum, this most frequent value 2 is adopted as CRcG(A).

If CDG(A) is discounted, this most frequent value is directly output as being an estimation of the count result of the characteristic words A.

If, in the present third technique, as in the first technique by truncation based on the confidence measures or in the second technique by an expectation, the statistical information usable for estimating CDG(A) is saved in the statistical information database 80, such information is used to find CDG(A), which CDG(A) may then be substituted into the equation (11). This leads to more accurate calculations for finding the estimated value CG(A).

If, as in the example shown in the explanation of the truncation technique by confidence measures, the average probability of an optional characteristic word in the correct solution text to drop out and vanish through error ($p1=0.15$) and the average probability of the characteristic word to be replaced by another word ($p2=0.1$)

are stored in the statistical information database 80, we get, from the equation (13):

$$CG(A)=2/(1-0.15-0.1)=\text{ca. } 2.7 \quad (16)$$

This value 2.7 of the equation (16) represents an estimation of the count result.

If the characteristic measure calculation unit 40 is able to accept a real number as the count result, the estimated count value may be directly delivered as output. If only an integer is accepted as the count result, the latter may be output, with the value below the decimal point being rounded down, rounded up or rounded.

If the concept of the most frequent value is to follow the result of the equation (16), the count result may be set to 3.

In the above example, CRcG(w) and CDG(w) of the equation (11) are found separately. More exactly, probabilities of the respective count results to hold may be found, and the count result which will give the maximum value of the probability may be used as CG(w).

The three techniques for calculating the estimated value CG(w) are shown above. These may converge to a general statistic problem of estimating a count result from the confidence measure of each characteristic word and from the statistical information stored in the statistical information database 80. Hence, there are also techniques other than the above-described three techniques.

In using the configuration of the present invention, it is sufficient to use a proper technique for estimation in keeping with the statistical tendency of predictable errors in the input text.

In the above three typical techniques, it is assumed that, for the purpose of calculations, the confidence measures (probabilities for giving correct solutions) of respective characteristic words are independent of one another. However, if these confidence measures are subordinate to one another, it is sufficient to use estimation techniques different from the case of independence so that the estimation techniques will be in keeping with the manner of subordination.

For example, if the input text is divided into a plurality of texts, and the probabilities for correct solutions of the same characteristic word in a given text are thought to be subordinate to one another, it might be possible to use a technique of adopting the lowest one of the confidence measures of the respective characteristic words in each text as the common confidence measure in the text, or a technique of taking an average value of the confidence measures in an individual text and adopting the average value as being the confidence measure in the text.

In the above description of the confidence measure exploiting characteristic word count unit 30, it is presupposed that the number of times of occurrence of each characteristic word in a text of a specific subset of the input texts is counted, and the result is output.

However, depending on the user's setting as entered via the user operation input device 70 and the mining process management unit 60, and on the text mining technique, as used in the present exemplary embodiment, there are cases where not the count result of each characteristic word but the number of the texts in which each characteristic word appears a number of times not less than or greater than a preset threshold value t is used for calculating the characteristic measure.

In this case, the manner of estimation of each characteristic word in the exemplary embodiment of the present invention is the same as that described above. That is, it suffices to carry out, for each text, a sequence of operations in which (S1) a count value of each characteristic word is estimated, (S2) it is then verified whether or not the estimated result is not less than or greater than a threshold value t, and (S3) the number of the texts, for which the estimated results are not less than or greater than the threshold value t, is counted.

<Characteristic Measure Calculation Unit 40>

The characteristic measure calculation unit 40 receives an estimation of the count result of each characteristic word as found by the characteristic word count unit 30, and calculates the characteristic measure of each characteristic word.

Which particular characteristic measure calculation is used differs with the user's setting as entered via the user operation input device 70 and mining process management unit 60 or with the text mining technique as used in the present exemplary embodiment.

The calculations for finding the characteristic measures by the characteristic measure calculation unit 40 are similar to those carried out in the conventional text mining technique and hence the detailed description thereof is dispensed with.

<Mining Result Output Device 50>

The mining result output device 50 is a device that outputs the characteristic measure of each characteristic word as calculated by the characteristic measure calculation unit 40. Outputting may be on a display or in the form of a file.

The particular form in which the characteristic word and its characteristic measure are to be output differs with the application or the objective of using the exemplary embodiment of the present invention. A parameter for outputting may be set beforehand and a preset number of characteristic words with characteristic measures may then be output in the decreasing order of the characteristic measures. Only those characteristic words, the characteristic measures of which exceed a certain threshold value, may be output. It is also possible to output characteristic words only for input texts belonging to a separately specified category instead of outputting characteristic words for the totality of data of the input texts.

<Mining Process Management Unit 60>

The mining process management unit 60 receives the user's setting, as entered via the user operation input device 70, and transmits the settings to the language processing unit 20, confidence measure exploiting characteristic word count unit 30 and the characteristic measure calculation unit 40 when these components come into operation.

When the texts as subjects of the text mining or the text mining processing sequence are input via the user operation input device 70, the mining process management unit 60 activates the respective components, namely the language processing unit 20, confidence measure exploiting characteristic word count unit 30 and the characteristic measure calculation unit 40, depending on the input operations.

For example, it is supposed that, in a questionnaire on cars, a user has entered the operations of finding a characteristic word of a company A that has the maximum characteristic measure, and then searching which characteristic measure the same characteristic word has in the category of another company C. In this case, the mining process management unit 60 executes the processing of the language processing unit 20 on the entire input texts.

The mining process management unit 60 then executes the processing by the confidence measure exploiting characteristic word count unit 30 and the characteristic measure calculation unit 40, for the texts of the category of the company A, to find the characteristic measure of each characteristic word for the category of the company A.

The mining process management unit 60 then searches which characteristic measure value the characteristic word with the maximum characteristic measure as found will have in the category of the company C. To this end, the mining process management unit 60 delivers a command to get the processing by the confidence measure exploiting characteristic word count unit 30 and the characteristic measure calculation unit 40 executed on the texts of the category of the company C.

The mining process management unit 60 is thus a component that manages the operations of the language processing unit 20, confidence measure exploiting characteristic word count unit 30 and the characteristic measure calculation unit 40 in response to the user's operations and settings.

<User Operation Input Device 70>

The user operation input device 70 is a device for the user to set
the language processing executed by the language processing unit 20,
the technique for correcting the count value of the count operation executed by the confidence measure exploiting characteristic word count unit 30 and
the method for calculating the characteristic measure calculated by the characteristic measure calculation unit 40. It is also a device for the user to enter
a subset of input texts as a subject of text mining, and
the processing sequence of the text mining.

<Statistical Information Database 80>

The statistical information database 80 is a database in which to hold
the tendency to occurrence of certain phrases and character/letter strings in the input text, and
the statistical information regarding the tendency to errors in the input text.

For example, the statistical information regarding the tendency to errors in a presupposed input text is
the probability of a word, a letter or a letter/character to be replaced through error by another word or another letter/character,
the probability of a word or a letter/character to drop out, and
the probability of an incorrect word or an incorrect letter/character to be inserted by error.

This statistical information is prescribed as a conditional probability that specifies the condition under which respective errors occur and the rates of occurrence of the respective errors.

The conditions of conditional probabilities may be subdivided with respect to condition types or error sorts may be subdivided or gross conditions may be used.

The probability with the subdivided conditions may be exemplified by such probability of a word B out of three specified words A, B and C that appear in succession in a given input text, for example, to drop out. That is, the probability with the subdivided conditions is not simply the probability of an arbitrary single word to drop out, but such a conditional probability in which certain limitations are imposed on the words or contexts immediately preceding or succeeding the word in question.

The probability with gross conditions may be exemplified by a conditional probability in which a word B is changed through error to another word although it is unknown which is such other word.

The above statistical information is used in the confidence measure exploiting characteristic word count unit 30 to find an estimated value of the count result of each characteristic word.

In general, the finer the degree of condition sub-division of the conditional probability with subdivided conditions that may be used, the more accurate is the estimation of the count result of each characteristic word. However, the finer the degree of condition subdivision, the more difficult it becomes to find the accurate prior probabilistic value.

The particular statistical information be stored in the statistical information database 80 may differ with the particular characteristic word count estimation technique used in the confidence measure exploiting characteristic word count unit 30 in using the exemplary embodiment of the present invention.

The statistical information database 80 is optional and is not indispensable in the exemplary embodiment of the present invention.

In case the statistical information database 80 is not provided, the confidence measure exploiting characteristic word count unit 30 finds an estimation of the count value of each characteristic word, using only the confidence measures provided in the input text.

In this case, the confidence measure exploiting characteristic word count unit 30 of course estimates the count value of each characteristic word with the use only of the confidence measures. The foregoing is an arrangement of the first exemplary embodiment of the present invention.

In the above explanation of the first exemplary embodiment, it is presupposed that at least one or more texts provided with the confidence measures is entered to the text input device 10. However, the present invention is not limited to this configuration.

<Processing of a Text not Provided with a Confidence Measure>

The first exemplary embodiment of the present invention is able to accept a text not provided with the confidence measures as a special case of the input text. In this case, the confidence measure exploiting characteristic word count unit 30 finds an estimated count value of each characteristic word using only the statistical information regarding the tendency to errors of the input text stored in the statistical information database 80.

It is assumed that probabilities indicated in the next paragraph, are stored in the statistical information database 80 in connection with an optional characteristic word w that may appear in an input text:

a probability that w in the correct solution text is replaced by another characteristic word: Pr(w)

a probability that w in the correct solution text is deleted through error: Pd(w)

a probability that w in the error containing text is a correct solution: PC(w)

Then, from the above definitions of the probabilities:

$$CD(w)/C(w)=Pr(w)+Pd(w) \quad (17)$$

and $$CRc(w)/CR(w)=PC(w) \quad (18)$$

From the equations (17), (18) and (8), the following equations (19) and (20) are derived:

$$C(w)=PC(w)*CR(w)+(Pr(w)+Pd(w))*C(w) \quad (19)$$

$$C(w)=PC(w)*CR(w)/(1-Pr(w)-Pd(w)) \quad (20)$$

Thus, in this case, the confidence measure exploiting characteristic word count unit 30 counts CR(w) from the input text in the customary fashion, and then reads in Pr(w), Pd(w) and PC(w), the necessary statistical information, from the statistical information database 80. The confidence measure exploiting characteristic word count unit 30 then substitutes the read information into the equation (20) to find C(w). Expressing more exactly, the confidence measure exploiting characteristic word count unit finds an estimated value CG(w) of C(w) using the statistical information.

Thus, even if no confidence measure is provided in the input text, the present invention can be carried out provided that the statistical information necessary for estimating the characteristic word is stored in the statistical information database 80.

<Implementation by a Program>

With the present exemplary embodiment, the text input device 10, language processing unit 20, confidence measure exploiting characteristic word count unit 30, characteristic measure calculation unit 40, mining result output device 50, mining process management unit 60, user operation input device 70 and the statistical information database 80 may be in the form of a program that controls the functions of various components. The program may be supplied as a machine-readable recording medium, such as a CD-ROM or a floppy disc (registered trademark) or over a network, such as the Internet, so as to be read in for execution on a computer.

Operation of First Exemplary Embodiment>

The operation of the text mining apparatus of the first exemplary embodiment of the present invention is now described with reference to the flowchart of FIG. 3.

In the operation of the text mining apparatus of the exemplary embodiment of the present invention, default setting is initially made and setting of language processing, carried out by the language processing unit 20, setting of the technique of correcting the count value by the confidence measure exploiting characteristic word count unit 30, setting of the method for calculating the characteristic measures by the characteristic measure calculation unit 40, setting of subsets of the input text as a subject of text mining and setting of the processing sequence of text mining are made in accordance with the operations and commands as entered by the user via the user operation input device 70 (step A1).

Figure 3:
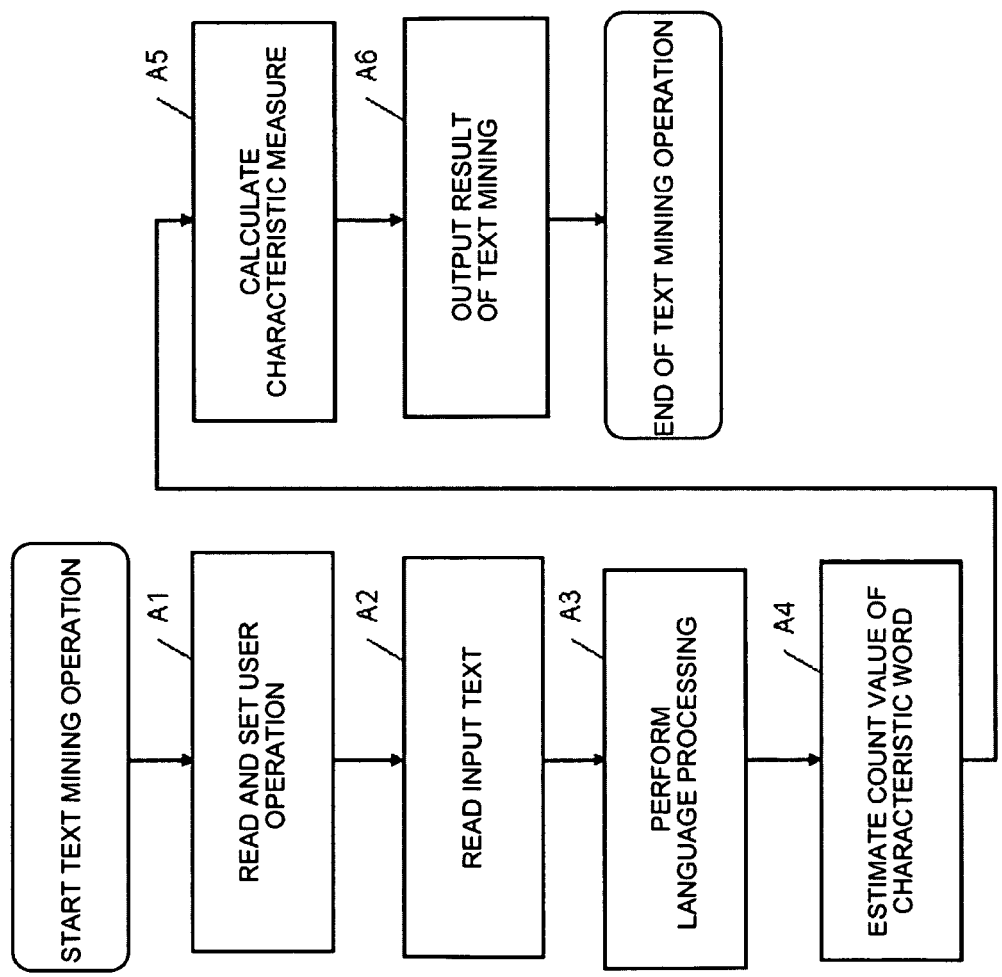
FIG. 3 is a flowchart for illustrating the operation of the first exemplary embodiment of the present invention.

In FIG. 3, this step A1 is the first processing of the text mining operation. It should be noted however that the processing currently performed by the apparatus may be discontinued or the setting may be changed by the apparatus at an optional time point during the operation in accordance with the operations or instructions from the user as entered via the user operation input device 70.

The text input device 10 that receives the text provided with the confidence measures reads in the text as an input text, and delivers the so read-in text to the language processing unit 20 (step A2).

If the confidence measures provided in the input text are not normalized, these are normalized so that they will represent the correct probabilistic values ranging from 0 to 1 both inclusive.

When supplied with the text, as input, the language processing unit carries out language processing, such as morphological analysis, dependency parsing, synonym analysis or unnecessary word processing, on the text, to perform transformation and shaping to units of characteristic words that may be dealt with in the text mining apparatus of the present invention.

If the unit of assignment of the confidence measure attached to the input text differ from the unit of the characteristic word resulting from the transformation or shaping by the language processing unit 20, it is necessary to change the assignment so that there is one confidence measure for each characteristic word unit (step A3).

Then, responsive to setting in the step A1 and to the text mining technique used in the present exemplary embodiment, the count value of the characteristic words appearing in the subset of the result of language processing of the input text as the subject of mining processing is estimated by the confidence measure exploiting characteristic word count unit 30 (step A4).

When the estimation of the count value of the characteristic word has come to a close, the estimated result is used to calculate the characteristic measure of each characteristic word (step A5).

Finally, the calculated result of the characteristic measure of each characteristic word is output as being the result of the text mining. If necessary, an output format may be transformed in accordance with the text mining processing sequence or the subject of text mining as commanded for operation in the step A1.

By the above operation, the entire operation of the text mining apparatus of the first exemplary embodiment of the present invention is finished.

<Second Exemplary Embodiment>

Figure 4:
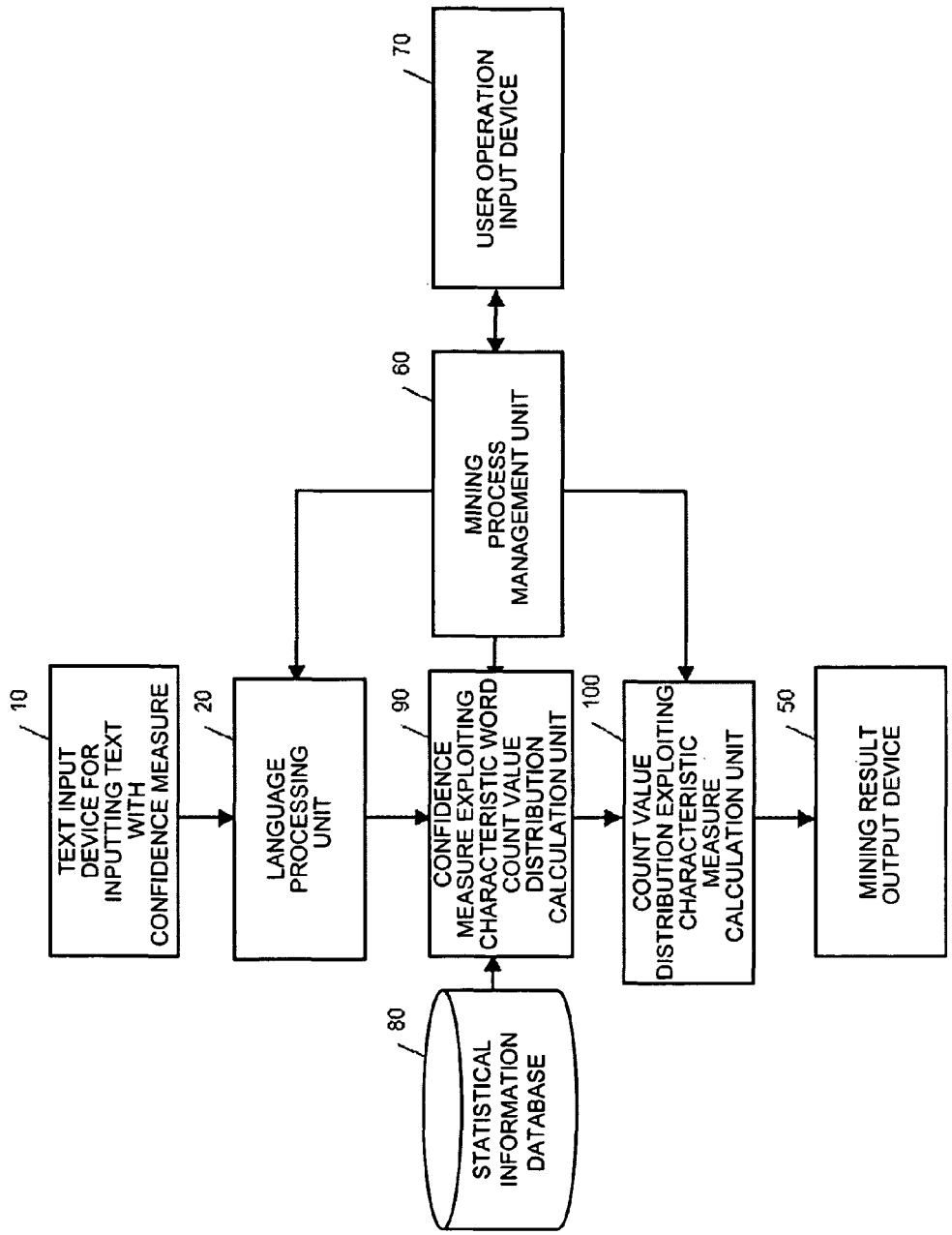
FIG. 4 is a block diagram showing the configuration of a second exemplary embodiment of the present invention.

A second exemplary embodiment of the present invention is now described. Referring to FIG. 4, the second exemplary embodiment of the present invention includes a text input device (10 of FIG. 4) for receiving a text provided with a confidence measure. The text input device 10 thus receives text data as a subject of mining. The second exemplary embodiment also includes a language processing unit (20 of FIG. 4) that performs language analysis of input text data of the input text provided with the confidence measure, a confidence measure exploiting characteristic word count value distribution calculation unit (90 of FIG. 2) that calculates the probability distribution of the count results using statistical information and the confidence measure attached to the input text, a count value distribution exploiting characteristic measure calculation unit (100 of FIG. 4) that calculates the characteristic measure of each characteristic word from the probability distribution of the count value of the characteristic word, a mining result output device (50 of FIG. 4) that outputs the characteristic measures of the characteristic words obtained, a user operation input device (70 of FIG. 4) for a user to enter the setting for language processing of the input text and the setting for techniques for calculating the characteristic measure to be found, a mining process management unit (60 of FIG. 4) that transfers user's instructions as entered from the user operation input device to respective components, and a statistical information database (80 of FIG. 4) that records and holds statistical information representing a property of the input text that may be presupposed to be entered.

In the text mining technique in general, the operation of counting the number of occurrences of the characteristic word in the input text is needed.

However, if the input text contains an error(s), it may sometimes occur that, even if the characteristic word in the input text is counted in the ordinary fashion, marked errors are produced as compared with the case of counting the characteristic word in the inherent correct solution text.

For example, it is assumed that the result of counting the characteristic word w in an input text that contains an error(s) indicates CR(w)=10.

However, in actuality, the number of times of occurrences of w may be zero (CW(0)=0), three (CW(0)=3) or eight (CW(0)=8). There is a possibility of the number of correct solutions being as many as 20.

The text mining apparatus of the second exemplary embodiment of the present invention thus uses a technique in which only one estimation CG(w) of the correct solution count C(w) is calculated, using the count result CR(w) from the input text and the confidence measure attached to the input text or statistical information representing a property of the input text. The estimation CG(w) of the count is then used to calculate the characteristic measure in the ordinary manner to reduce errors in the confidence measure otherwise caused by errors.

To find the sole estimation CG(w) of the correct count C(w), the technique of regarding the count result of the characteristic word to be a stochastic variable, and using a representative value thereof, such as an average value or the most frequent value, as the sole estimation, has been described above.

The second exemplary embodiment of the present invention, on the other hand, does not find the sole estimation of the count value of the characteristic word. Instead, the present exemplary embodiment finds, in the confidence measure exploiting characteristic word count value distribution calculation unit 90, the count value that may be taken on, and the probability thereof, that is, the probability distribution of the count values. The second exemplary embodiment then finds, in the count value distribution exploiting characteristic measure calculation unit 100, an estimation of each confidence measure from the probability distribution of the count values, thus found, by the count value distribution exploiting characteristic measure calculation unit 100.

With the second exemplary embodiment, the estimation accuracy of the characteristic measures may be improved over that of the first exemplary embodiment even though the computational volume of the second exemplary embodiment is increased.

Excepting the confidence measure exploiting characteristic word count value distribution calculation unit 90 and the count value distribution exploiting characteristic measure calculation unit 100, the components shown in FIG. 4 are basically the same in operation as the corresponding components shown in FIG. 1. Thus, the following description is made only for those components that differ in operation from the corresponding components of FIG. 1, and the components of the same functions are not described to avoid redundancy.

The text input device 10 that receives a text provided with confidence measures, and the language processing unit 20, are the same as those of the first exemplary embodiment.

<Confidence Measure Exploiting Characteristic Word Count Value Distribution Calculation Unit 90>

The confidence measure exploiting characteristic word count value distribution calculation unit 90 is a component that counts how many times each characteristic word occurs in the text of a certain specified subset of the input text and that delivers the count result to the count value distribution exploiting characteristic measure calculation unit 100.

It is noted that the 'certain specified subset of the input text' differs in dependence upon the particular text mining technique used in the exemplary embodiment of the present invention and upon the particular user's setting entered via the user operation input device 70 and the mining process management unit 60.

The probably distribution is calculated using the actual count result CR(w) of the error containing input text and the confidence measure attached to the input text or the statistical information representing the properties of the text.

For example, if the probability of a characteristic word w in the correct solution input text to drop out through error or to be replaced by another word is that low, $CD(w) \cong 0$ holds from its definition.

Thus, the following equation (21)

$$C(w) \cong CR_C(w) \tag{21}$$

is derived from the equation (8).

That is, the count result for the number of times of occurrences, thought to represent the correct solution, out of the count results obtained by calculations in the input text, represents the count result in the correct solution text. It is assumed at this time that the characteristic word A in an input text belonging to a certain category is to be counted.

It is now assumed that, as a result of the ordinary counting, the characteristic word A appears three times in the subject text, with the three confidence measures being 1, 0.8 and 0.4.

The possible count results and the probabilities for them are calculated. The count result with the highest probabilistic value represents the most frequent value for this case. By actual calculations, we get the following probabilistic values: probability for zero occurrence=(1−1)*(1−0.8)*(1−0.4)=0 probability for one occurrence=1*(1−0.8)*(1−0.4)+(1−1)*0.8*(1−0.4)+(1−1)*(1−0.8)*0.4=0.12
probability for two occurrences=1*0.8*(1−0.4)+1*(1−0.8)*0.4+(1−1)*0.8*0.4=0.48+0.08=0.56
probability for three occurrences=1*0.8*0.4=0.32

From the equation (20), the above represents the probability distribution of C(A) to be found.

If the probability distribution of the count result of the characteristic word w or that of CD(w) is given as the statistical information, it may be used to calculate the probability distribution of C(w). In this case, it is unnecessary to find respective probabilities for each occurrence time number, such as the probability time number of zero, that for the occurrence time number of 1, that time for the occurrence number of 2 and so forth.

For example, if there is the statistical information that C(w) follows the binomial distribution with CR(w) as an average value, with the probability of correct solution being 0.8, it is possible to count CR(w) from the input text and to calculate the probability distribution of C(w) using the count result.

<Count Value Distribution Exploiting Characteristic Measure Calculation Unit 100>

The count value distribution exploiting characteristic measure calculation unit 100 calculates the distribution of the characteristic measure of each characteristic words, from the distribution of the count values of the characteristic words as found by the confidence measure exploiting characteristic word count value distribution calculation unit 90. From the calculated result, the count value distribution exploiting characteristic measure calculation unit outputs a sole characteristic measure for each characteristic word as an estimation of the characteristic measure.

In text mining, the characteristic measure of each characteristic word is defined in general as a function having one or more count results as an argument.

In this confidence measure function, the count result is not necessarily a sole argument, because the number of documents, for example, may be an argument. However, the other argument(s) are not affected by errors in the error containing input text. Thus, the count value distribution of the characteristic words, needed for calculating the characteristic measure function, and which has been found by the confidence measure exploiting characteristic word count value distribution calculation unit 90, is substituted into the characteristic measure function. By so doing, it is possible to calculate the values of the characteristic measure and the probabilistic values thereof, that is, the probability distribution of the confidence measure.

If once the probability distribution of the characteristic measures has been found, a sole representative estimated value is selected out of the estimated values of the characteristic measures of the respective characteristic words, in accordance with pre-set setting or setting as instructed by the user by the user operation input device 70. The sole representative estimated value, thus selected, is then output.

This representative value may be selected from the probability distribution of the characteristic measure by techniques of using
    an expectation of the confidence measure;
    the most frequent value of the confidence measure;
    the smallest value of the confidence measure; or
    the greatest value of the confidence measure.

Another technique to find the characteristic measure function uses a probability quantile point of the characteristic measure function. The probability quantile point is a statistical concept that denotes the value of a variable the cumulative probabilistic value of which exceeds a preset probabilistic value x %. For example, 'the confidence measure at a 90% probability quantile point is 3' in a result of calculations for a certain characteristic measure indicates that the probability of a value 3 of the confidence measure to be underestimated is less than 10%. This technique might be effective for a case where it is not desirable to underestimate the characteristic measure.

The mining result output device 50 is a device that outputs the characteristic measure of each characteristic word calculated by the count value distribution exploiting characteristic measure calculation unit 100 as being the result of mining. The mining result output device 50 is otherwise the same as the mining result output device 50 of the above-described first exemplary embodiment.

The mining process management unit 60 receives a user's setting, as entered via the user operation input device 70, and informs language processing unit 20, the confidence measure exploiting characteristic word count value distribution calculation unit 90 and the count value distribution exploiting characteristic measure calculation unit 100 in case of coming into operation of the user's setting.

When the text mining processing sequence or the texts as subjects of the text mining are entered via the user operation input device 70, the mining process management unit 60 activates the respective components, namely the language processing unit 20, confidence measure exploiting characteristic word count value distribution calculation unit 90 and to the count value distribution exploiting characteristic measure calculation unit 100, depending on the input operations. The mining process management unit is the same as the corresponding component of the first exemplary embodiment except the difference in the settings and the components being booted.

The user operation input device 70 is a device by which a user may enter
    setting for language processing executed by the language processing unit 20;
    setting for a technique for calculating the count value distribution, carried out by the confidence measure exploiting characteristic word count value distribution calculation unit 90;
    setting for a method for calculating the characteristic measure by the count value distribution exploiting characteristic measure calculation unit 100;
    a subset of the input texts as subject for text mining; and
    a processing sequence for text mining.

<Statistical Information Database 80>

The statistical information database 80 is the same as the statistical information database 80 of the first exemplary embodiment except that the forwarding destination of the statistical information saved therein is changed from the confidence measure exploiting characteristic word count unit 30 to the confidence measure exploiting characteristic word count value distribution calculation unit 90.

The foregoing is the configuration of the second exemplary embodiment of the present invention.

Processing of a Text not Provided with a Confidence Measure>

In the second exemplary embodiment of the present invention, it is again possible, as in the first exemplary embodiment, described above, that the text input device 10 receives a text not provided with the confidence measures, as a special case of the input text. In such case, the confidence measure exploiting characteristic word count value distribution calculation unit 90 finds the count value distribution of the respective characteristic words using only the statistical information on the tendency to errors in the input texts saved in the statistical information database 80.

For accepting a text not provided with the confidence measure, it is necessary that the statistical information necessary for finding the probability distribution of the count results of the respective characteristic words is stored in the statistical information database 80.

For example, if the following statistical information pertinent to the characteristic words: 'A correct count value result C(w) of each characteristic word follows the Poisson's distribution having the count value result CR(w) of the characteristic words in an input text as an average value' has been known, the probability distribution of the count values may be calculated from the count value result CR(w) of the input text.

<Implementation by a Program>

With the present second exemplary embodiment, the text input device 10, language processing unit 20, confidence measure exploiting characteristic word count value distribution calculation unit 90, count value distribution exploiting characteristic measure calculation unit 100, mining result output device 50, mining process management unit 60, user operation input device 70 and the statistical information database 80 may be in the form of a program that controls the functions of various components. The program may be supplied as a machine-readable recording medium, such as a CD-ROM or a floppy disc (registered trademark) or over a network, such as the Internet, so as to be read in for execution by a computer.

<Operation of Second Exemplary Embodiment>

The operation of the text mining apparatus of the second exemplary embodiment of the present invention is now described with reference to the flowchart of FIG. 5.

In the operation of the text mining apparatus of the second exemplary embodiment of the present invention, default setting is initially made. Then, the setting of language processing, carried out by the language processing unit 20, the setting of calculation means for calculating the count value probability distribution as executed by the confidence measure exploiting characteristic word count value distribution calculation unit 90, the setting of the method for calculating the characteristic measures by the count value distribution exploiting characteristic measure calculation unit 100, the setting of subsets of the input text as a subject of text mining and the setting of the processing sequence of text mining are made in accordance with the operations and commands by the user as entered via the user operation input device 70 (step B1).

Figure 5:
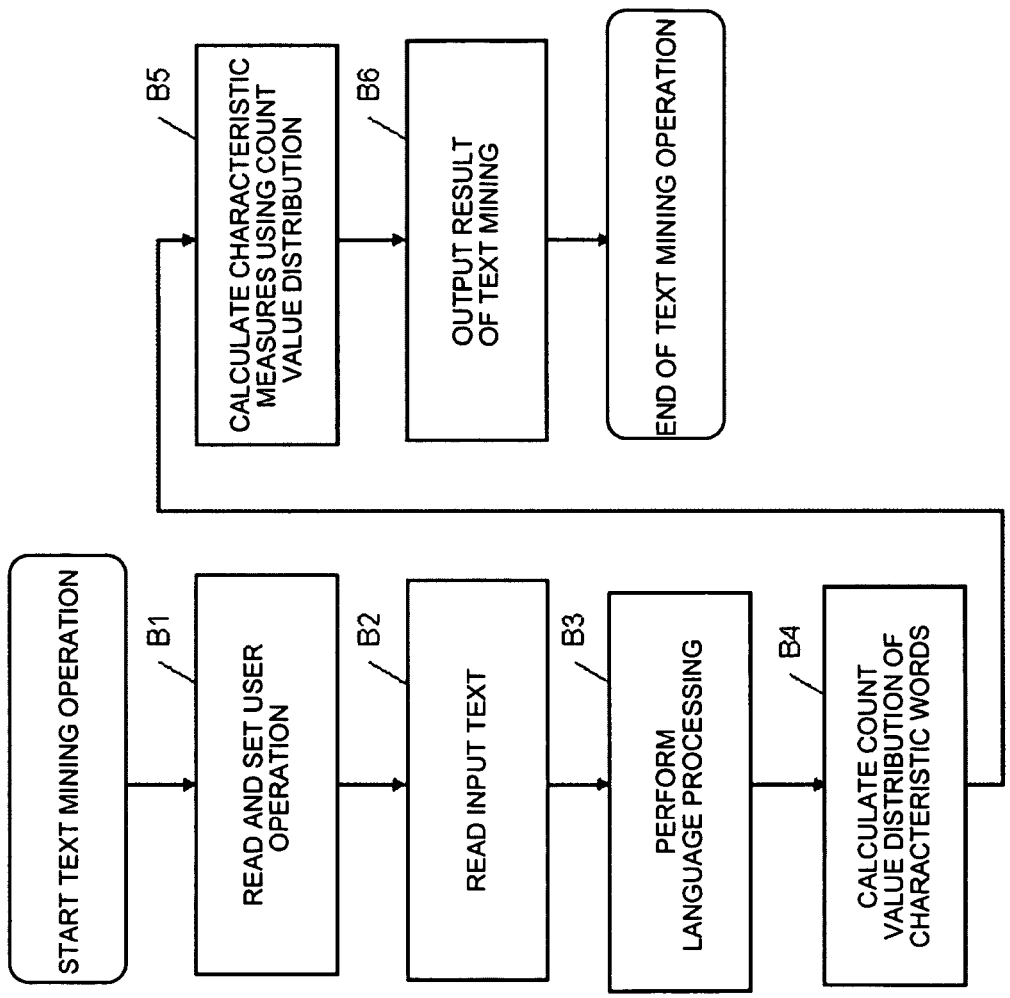
FIG. 5 is a flowchart for illustrating the operation of the second exemplary embodiment of the present invention.

In FIG. 5, this step B1 is the first processing of the text mining operation. It should be noted however that the processing currently performed by the apparatus may be discontinued or the setting may be changed by the apparatus at an optional time point during the operation in accordance with the operations or instructions from the user as entered via the user operation input device 70.

The text input device 10 that receives the text provided with the confidence measures reads in the text as an input text, and delivers the so read-in text to the language processing unit 20 (step B2).

If the confidence measures provided in the input text are not normalized, the language processing unit normalizes the confidence measures so that they will represent correct probabilistic values ranging from 0 to 1 both inclusive.

The language processing unit then carries out language processing, such as morphological analysis, dependency parsing, synonym analysis or unnecessary word processing, on the text supplied, to perform transformation and shaping to units of characteristic words that may be handled in the text mining apparatus of the present invention.

If the units of assignment of the confidence measures, accorded in the input text, differ from the units of the characteristic words resulting from the transformation or shaping by the language processing unit 20, it is necessary to change the assignment so that there is one confidence measure for each characteristic word unit (step B3).

Then, responsive to setting in the step B1 and to the text mining technique used in the present exemplary embodiment, the probability distribution of the count values of the characteristic words of the result of language processing of the input text appearing in the subset as the subject of mining processing is calculated by the confidence measure exploiting characteristic word count value distribution calculation unit 90 (step B4).

When the calculations of the count value of the characteristic words are finished, the result is used to calculate the probability distribution of the characteristic measure of the characteristic word. From the result of the calculations, an estimated value to be output as the characteristic measure of each characteristic word is found (step B5).

Finally, the calculated result of the characteristic measure of each characteristic word is output as being the result of the text mining.

If necessary, an output format may be transformed in accordance with the setting of the text mining processing sequence or the subject of text mining as instructed for operation in the step B1 (step B6).

By the above operation, the entire operation of the text mining apparatus of the second exemplary embodiment of the present invention is finished.

INDUSTRIAL APPLICABILITY

The present invention may be applied to a text mining apparatus that is able to calculate characteristic words and the characteristic measures thereof from text data prepared with confidence measures from the speech obtained in businesses at the contact centers or call centers using a speech recognition technique. The present invention may also be applied to such application as program for implementing the text mining apparatus onboard a computer.

In addition, the present invention may be applied to a text mining apparatus that calculates the characteristic measures of characteristic words to high accuracy from text data prepared with confidence measures from text data recorded on a paper sheet using a letter/character recognition technique. The present invention may also be applied to a program for implementing the text mining apparatus onboard a computer.

Although the present invention has so far been described with reference to preferred embodiments, the present invention is not to be restricted to the embodiments. It is to be appreciated that those skilled in the art can change or modify the embodiments without departing from the spirit and the scope of the present invention.

The particular exemplary embodiments or examples may be modified or adjusted within the gamut of the entire disclosure of the present invention, inclusive of claims, based on the fundamental technical concept of the invention. Further, variegated combinations or selection of subjects disclosed herein may be attempted within the framework of the appended claims.

The invention claimed is:

1. A text mining apparatus which, when one or more of input texts as subjects of text mining is entered, outputs at least one set of a characteristic word and a characteristic measure representing a characteristic of the input text, the apparatus comprising:
   a characteristic word count unit that, in counting the number of each characteristic word in the input text, calculates a statistical estimation of a count result using statistical information representing a property of the input text and/or a confidence measure attached to the input text;
   a characteristic measure calculation unit that calculates the characteristic measure of each characteristic word using the statistical estimation of the count result of the each characteristic word, the statistical estimation being calculated by the characteristic word count unit;
   a language processing unit that performs language analysis of text data entered from a text input device to transform and shape the text data into units of the characteristic words; and
   a statistical information database that records and holds the statistical information representing a property of the input text presupposed to be entered,
   the characteristic word count unit counting the number of the characteristic word in the input text and acquiring an estimation of the number of times of occurrence of the characteristic word by exploiting a confidence measure provided in the input text and/or statistical information representing a property of the input text;
   a characteristic measure calculation unit that calculates the characteristic measure of each characteristic word from the estimation of the number of times of occurrence of the characteristic words as found by the characteristic word count unit,
   the characteristic word count unit finding an estimation of a count value of each characteristic word of the input text not provided with the confidence measure using the preset statistical information of the input texts stored in the statistical information database.

2. A text mining apparatus which, when supplied with at least one input text as a subject of text mining, outputs at least one set of a characteristic word and a characteristic measure representing a characteristic of the input text, the apparatus comprising:
   a characteristic word count value distribution calculation unit that calculates a probability distribution of count values of characteristic words contained in the input text;
   a count value distribution exploiting characteristic measure calculation unit that calculates a statistical estimation of the characteristic measure of each characteristic word using the probability distribution of the count values calculated by the characteristic word count value distribution calculation unit, the statistical estimation being used as the result of text mining;
   a language processing unit that analyzes the language of text data entered via a text input device to transform and shape the text data into units of the characteristic words; and
   a statistical information database that records and holds the statistical information representing a property of the input texts supposed to be entered,
   the characteristic word count value distribution calculation unit counting the characteristic words in the input text and calculating the probability distribution of a count result using a confidence measure provided in the input text and/or the statistical information representing a property of the input text,
   the count value distribution exploiting characteristic measure calculation unit finding an estimation of each characteristic measure from the probability distribution of the count values of the characteristic words found by the characteristic word count value distribution calculation unit,
   the characteristic word count value distribution calculation unit finding a count value distribution of each characteristic word in the input text not provided with the confidence measure, using the preset statistical information of the input text stored in the statistical information database.

3. A text mining apparatus which, when one or more of input texts as subjects of text mining is entered, outputs at least one set of a characteristic word and a characteristic measure representing a characteristic of the input text, the apparatus comprising:
   a characteristic word count unit that, in counting the number of each characteristic word in the input text, calculates a statistical estimation of a count result using statistical information representing a property of the input text and/or a confidence measure attached to the input text;
   a characteristic measure calculation unit that calculates the characteristic measure of each characteristic word using the statistical estimation of the count result of the each characteristic word, the statistical estimation being calculated by the characteristic word count unit;
   a language processing unit that performs language analysis of text data entered from a text input device to transform and shape the text data into units of the characteristic words;
   the characteristic word count unit counting the number of the characteristic word in the input text and acquiring an estimation of the number of times of occurrence of the characteristic word by exploiting a confidence measure provided in the input text and/or statistical information representing a property of the input text,
   a characteristic measure calculation unit that calculates the characteristic measure of each characteristic word from the estimation of the number of times of occurrence of the characteristic words as found by the characteristic word count unit,
   a mining result outputting device that outputs a characteristic measure of each characteristic word obtained;
   a user operation input device that receives a user's command information including setting in language processing of the input text and setting of the technique for calculating the characteristic measure being found; and
   a mining processing management unit that transmits a command entered by the user operation input device to respective components.

4. A text mining apparatus which, when one or more of input texts as subjects of text mining is entered, outputs at least one set of a characteristic word and a characteristic measure representing a characteristic of the input text, the apparatus comprising:
   a statistical information database that records and holds statistical information representing a property of an input text presupposed to be entered;
   a characteristic word count unit that normalizes a confidence measure provided in the input text, except for a case where the confidence measure is already normalized to a correct solution probability of a character string in the input text with the confidence measure attached, and, using at least one of the normalized value of the confidence measure and a probability value regarding tendency to errors in the input text stored in the statistical information database, calculates an estimation value of the number of occurrence times of a correct solution of a characteristic word from a count value of occurrence times of the characteristic word included in the input text, wherein in calculating the estimation value of the number of occurrence times of a correct solution of the characteristic ward, the characteristic word count unit performs one of:

a processing that compares one of the normalized value and a correct solution probability value calculated from the probability value regarding tendency to errors in the input text stored in the statistical information database, with a predetermined truncation threshold value and counts the occurrence times of the characteristic word in the input text, except for a text with a correct solution probability value having a predetermined truncation threshold value or less to adopt the count value as the estimation value of the number of occurrence times of a correct solution of the characteristic word;

a processing that, using one of the normalized value and a correct solution probability value calculated from the probability value regarding tendency to errors in the input text stored in the statistical information database, calculates a correct solution probability at each location at which the characteristic word occurs in the input text, and calculates an expectation value of occurrence times of the characteristic word from a calculation result of the correct solution probability to adopt the expectation value as the estimation value of the number of occurrence times of a correct solution of the characteristic word; and a processing that, using one of the normalized value and a correct solution probability value calculated from the probability value regarding tendency to errors in the input text stored in the statistical information database, calculates a correct solution probability at each location at which the characteristic word occurs in the input text, and calculates a most frequent value of the occurrence times of the characteristic word from a calculation result of the correct solution probability to adopt the most frequent value as the estimation value of the number of occurrence times of a correct solution of the characteristic word;

a characteristic measure calculation unit that calculates the characteristic measure of the characteristic word, based on the estimation value of the occurrence times of the characteristic word; and an output device that outputs the characteristic measure of the characteristic word calculated by characteristic measure calculation unit.

5. The text mining apparatus according to claim 4, further comprising:

a language processing unit that analyzes the language of text data entered via a text input device to transform and shape the text data into units of the characteristic words, the characteristic word count unit calculating the estimation value of number of occurrence times of a correct solution of the characteristic word in the input text, based on an analysis result by the language processing unit.

6. The text mining apparatus according to claim 4, wherein, using a probability value regarding tendency to errors in the input text stored in the statistical information database, the characteristic word count unit calculates the estimation value of the number of occurrence times of a correct solution of each characteristic word in the input text which is not provided with the confidence measure.

7. The text mining apparatus according to claim 4, wherein the text input device inputs the input text, a part or all of the input text being described in a word graph or N-best, wherein a recognition result of a specific location in the input text includes a plurality of recognition candidate character strings, each with the confidence measure attached.

8. The text mining apparatus according to claim 4, wherein the characteristic word count unit finds a probability distribution of the number of occurrence times of the characteristic word, in stead of calculating the estimation value of the number of occurrence times of the characteristic word, and the characteristic measure calculation unit calculates the characteristic measure of the characteristic word, based on the probability distribution of the occurrence times of the characteristic word.

9. The text mining apparatus according to claim 4, wherein if the input text is divided into a plurality of texts, and the probability for a correct solution of the same characteristic word in the text are subordinate to one another, the characteristic word count unit, adopting a lowest one of the confidence measures of the respective characteristic words in each text as a common confidence measure in the input text, or taking an average value of the confidence measures in individual texts to adopt the average value as being the common confidence measure in the input text, calculates the estimation value of the number of occurrence times of a correct solution of the characteristic word.

10. A text mining method by a text mining apparatus comprising a statistical information database that records and holds statistical information representing a property of an input text presupposed to be entered, wherein, when one or more of input texts as subjects of text mining is entered, the text mining apparatus at least one set of a characteristic word and a characteristic measure representing a characteristic of the input text is output, said method comprising:

a characteristic word count step that normalizes a confidence measure provided in the input text, except for a case where the confidence measure is already normalized to a correct solution probability of a character string in the input text with the confidence measure attached, and, using at least one of the normalized value of the confidence measure and a probability value regarding tendency to errors in the input text stored in the statistical information database, calculates an estimation value of the number of occurrence times of a correct solution of a characteristic word from a count value of occurrence times of the characteristic word included in the input text, wherein in calculating the estimation value of the number of occurrence times of a correct solution of the characteristic word, the characteristic word count processing step performs one of:

a processing that compares one of the normalized value and a correct solution probability value calculated from the probability value regarding tendency to errors in the input text stored in the statistical information database, with a predetermined truncation threshold value and counts the occurrence times of the characteristic word in the input text, except for a text with a correct solution probability value having a predetermined truncation threshold value or less to adopt the count value as the estimation value of the number of occurrence times of a correct solution of the characteristic word;

a processing that, using one of the normalized value and a correct solution probability value calculated from the probability value regarding tendency to errors in the input text stored in the statistical information database, calculates a correct solution probability at each location at which the characteristic word occurs in the input text, and calculates an expectation value of occurrence times of the characteristic word from a calculation result of the correct solution probability to adopt the expectation value as the estimation value of the number of occurrence times of a correct solution of the characteristic word; and a processing that, using one of the normalized value and a correct solution probability value calculated from the probability value regarding tendency to errors in the input text stored in the statistical information database, calculates a correct solution probability at each location at which the characteristic word occurs in the input text, and calculates a most frequent value of the occurrence times of the characteristic word from a calculation result of the correct solution probability to adopt the most frequent value as the estimation value of the number of occurrence times of a correct solution of the characteristic word;

a characteristic measure calculation step that calculates the characteristic measure of the characteristic word, based on the estimation value of the occurrence times of the characteristic word; and an output step that outputs the characteristic measure of the characteristic word calculated in the characteristic measure calculation step.

11. A non-transitory computer-readable data storage medium storing a computer program that when executed by a computer causes the computer to execute processing, the computer constituting a text mining apparatus comprising a statistical information database that records and holds statistical information representing a property of an input text presupposed to be entered, wherein, when one or more of input texts as subjects of text mining is entered, the text mining apparatus at least one set of a characteristic word and a characteristic measure representing a characteristic of the input text is output, the processing comprising:

a characteristic word count processing that normalizes a confidence measure provided in the input text, except for a case where the confidence measure is already normalized to a correct solution probability of a character string in the input text with the confidence measure attached, and, using at least one of the normalized value of the confidence measure and a probability value regarding tendency to errors in the input text stored in the statistical information database, calculates an estimation value of the number of occurrence times of a correct solution of a characteristic word from a count value of occurrence times of the characteristic word included in the input text, wherein in calculating the estimation value of the number of occurrence times of a correct solution of the characteristic word, the characteristic word count processing performs one of:

a processing that compares one of the normalized value and a correct solution probability value calculated from the probability value regarding tendency to errors in the input text stored in the statistical information database, with a predetermined truncation threshold value and counts the occurrence times of the characteristic word in the input text, except for a text with a correct solution probability value having a predetermined truncation threshold value or less to adopt the count value as the estimation value of the number of occurrence times of a correct solution of the characteristic word;

a processing that, using one of the normalized value and a correct solution probability value calculated from the probability value regarding tendency to errors in the input text stored in the statistical information database, calculates a correct solution probability at each location at which the characteristic word occurs in the input text, and calculates an expectation value of occurrence times of the characteristic word from n calculation result of the correct solution probability to adopt the expectation value as the estimation value of the number of occurrence times of a correct solution of the characteristic word; and a processing that, using one of the normalized value and a correct solution probability value calculated from the probability value regarding tendency to errors in the input text stored in the statistical information database, calculates a correct solution probability at each location at which the characteristic word occurs in the input text, and calculates a most frequent value of the occurrence times of the characteristic word from a calculation result of the correct solution probability to adopt the most frequent value as the estimation value of the number of occurrence times of a correct solution of the characteristic word;

a characteristic measure calculation processing that calculates the characteristic measure of the characteristic word, based on the estimation value of the occurrence times of the characteristic word; and an output processing that outputs the characteristic measure of the characteristic word calculated by the characteristic measure calculation processing.

\* \* \* \* \*